(12) United States Patent
Trefz et al.

(10) Patent No.: US 7,278,502 B2
(45) Date of Patent: Oct. 9, 2007

(54) IMPLEMENT AND POWER TAKE OFF ATTACHMENT SYSTEM

(75) Inventors: Harlin James Trefz, Jackson, TN (US); David Orrin Ross, Evans, GA (US); Brian Richard Clement, Grovetown, GA (US); Kenneth Edward Hunt, Rock Hill, SC (US)

(73) Assignee: Deere & Company, Moline, IL (US)

( * ) Notice: Subject to any disclaimer, the term of this patent is extended or adjusted under 35 U.S.C. 154(b) by 351 days.

(21) Appl. No.: 10/941,143

(22) Filed: Sep. 15, 2004

(65) Prior Publication Data
US 2006/0055140 A1    Mar. 16, 2006

(51) Int. Cl.
*B60K 25/06* (2006.01)
(52) U.S. Cl. .................................. 180/53.1; 180/53.3
(58) Field of Classification Search ............... 180/53.1, 180/53.3, 53.6, 53.61, 53.62, 53.7, 53.8; 403/DIG. 4; 172/47; 464/162
See application file for complete search history.

(56) References Cited

U.S. PATENT DOCUMENTS

| 2,769,646 | A |   | 11/1956 | Omon et al. ................ 280/504 |
| RE24,415  | E |   | 1/1958  | Oehler et al. ............... 280/477 |
| 2,869,654 | A |   | 1/1959  | Hershman .................... 172/272 |
| 2,880,811 | A | * | 4/1959  | Kuester ........................ 172/75 |
| 3,420,550 | A |   | 1/1969  | Rau ............................ 280/461 |
| 3,427,046 | A |   | 2/1969  | Sommer et al. |
| 3,539,203 | A |   | 11/1970 | Baugh ......................... 280/504 |
| 3,544,133 | A |   | 12/1970 | Lemmon et al. ............ 280/479 |
| 3,572,759 | A |   | 3/1971  | Baugh et al. ................ 280/461 |
| 3,572,760 | A |   | 3/1971  | Jones et al. ................. 280/461 |
| 3,817,557 | A |   | 6/1974  | Manor ......................... 280/452 |
| 3,977,698 | A |   | 8/1976  | von Allworden ........... 280/461 |
| 4,069,885 | A |   | 1/1978  | Gego et al. ................... 180/14 |
| 4,090,725 | A |   | 5/1978  | Perin .......................... 280/479 |
| 4,176,727 | A |   | 12/1979 | Perin .......................... 180/53 |
| 4,340,240 | A |   | 7/1982  | Anderson ................... 280/461 |
| 4,415,175 | A |   | 11/1983 | Kainer ........................ 280/460 |
| 4,433,767 | A |   | 2/1984  | Thor ........................... 192/67 |

(Continued)

FOREIGN PATENT DOCUMENTS

EP    0 068 106    5/1982

(Continued)

OTHER PUBLICATIONS

Yanmar, PTO Connection, 2000, 1 Page.

(Continued)

*Primary Examiner*—Paul N. Dickson
*Assistant Examiner*—Barry Gooden, Jr.

(57) ABSTRACT

A quick attaching coupler is mounted to a tractor three point hitch, with a first actuator linked to latches on both sides of the hitch. The first actuator may be moved by a seated operator between a first position wherein both latches are unlatched and a second position wherein both latches are latched. A quick PTO coupler is mounted to the quick attaching coupler, and has a sleeve carrying a first end of a tractor PTO shaft. The sleeve pivots independently of the latches between a first PTO disengaged position and a second PTO engaged position. A second actuator linked to the sleeve may be moved by the seated operator between a first position wherein the PTO is disengaged and a second position wherein the PTO is engaged.

19 Claims, 6 Drawing Sheets

U.S. PATENT DOCUMENTS

| | | | |
|---|---|---|---|
| 4,492,292 A | 1/1985 | Thor | 192/67 |
| 4,549,744 A | 10/1985 | Herr et al. | 280/415 |
| 4,792,006 A | 12/1988 | Nienhaus et al. | 180/53.3 |
| 4,799,563 A | 1/1989 | Yukino | 180/14.4 |
| 4,887,680 A | 12/1989 | Nozaka et al. | 180/53.3 |
| 4,934,471 A | 6/1990 | Tanaka et al. | 180/14.4 |
| 4,944,354 A | 7/1990 | Langen et al. | 172/47 |
| 5,064,338 A | 11/1991 | Lawrence | 414/685 |
| 5,193,623 A | 3/1993 | Burette | 172/47 |
| 5,303,790 A | 4/1994 | Coleman | 180/53.3 |
| 5,538,088 A | 7/1996 | Wait | 172/439 |
| 5,657,825 A | 8/1997 | Englund | 172/439 |
| 5,816,339 A | 10/1998 | Parsons et al. | 172/449 |
| 6,062,319 A | 5/2000 | Schwalenberg et al. | 172/272 |
| 6,264,360 B1 * | 7/2001 | Lehmusvaara et al. | 366/331 |
| 6,725,583 B2 | 4/2004 | Sprinkle et al. | 37/468 |

FOREIGN PATENT DOCUMENTS

| | | |
|---|---|---|
| EP | 0 568 854 A2 | 11/1993 |
| EP | 0 617 882 A1 | 10/1994 |
| EP | 0 730 398 | 12/1999 |
| FR | 2 550 910 | 3/1985 |
| WO | WO95/10174 | 10/1994 |

OTHER PUBLICATIONS

Ekeberg, Quick Coupling PTO Connection, 2000, 3 Pages.

* cited by examiner

IMPLEMENT AND POWER TAKE OFF ATTACHMENT SYSTEM

FIELD OF THE INVENTION

This invention relates generally to coupling devices for connecting a tractor or other similar vehicle to a rear mounted implement, and more specifically to latching a quick attaching coupler and engaging a power take off from a tractor to a rear mounted implement.

BACKGROUND OF THE INVENTION

Quick attaching couplers have been developed to allow faster attachment of three point hitches to rear mounted implements. A quick attaching coupler may be an inverted U-shape arch that is attached to the conventional three points of a tractor hitch. The frame of a quick attaching coupler may have an upper hook with a long, tapered point and two lower coupling hooks or jaws with a latching and unlatching arrangement to hold the implement hitch pins. To hook up the quick attaching coupler to an implement, the hitch may be lowered and the tractor or similar vehicle backed into place near the implement. Then the hitch may be raised with the hydraulic system so that the upper hook engages the upper pin on the implement. Further lifting causes the weight of the implement to force the lower hitch pins to enter the lower hooks.

The tractor operator then may lock each of the latches to secure the implement hitch pins to the hooks. The latches may be spring loaded to the locked or latched position. To lock each latch to the implement, the operator must dismount the operator station or tractor seat to manually operate two locking mechanisms for the two hitch pins of the implement.

Similarly, to unhitch an implement from a quick attach coupler, the tractor operator must leave the operator station or tractor seat to manually release the spring loaded latches. Once the latches are released, the hitch may be lowered until the implement is on the ground. Then, after the hitch is lowered further, the two lower hooks and the upper hook disengage from the implement and the tractor can be driven away.

Tractors may be equipped with a power take off (PTO) drive that provides a means for transmitting rotary power from the engine to implements that are coupled to a tractor. The most common location for the PTO shaft is at the rear of the tractor, but some tractors have auxiliary PTO shafts at other locations. The direction of rotation, rotational speed, approximate location and exact dimensions of the PTO shaft are standardized to provide ability to interchange between power shafts on various implements made by different manufacturers. PTO shafts typically rotate at 540 rpm, 1000 rpm, or both speeds.

To engage the PTO shaft to the power shaft of a rear mounted implement, the, the PTO shaft may have the ability to telescope. After the tractor is in proper position, the tractor operator may manually extend the telescoping PTO shaft and employ various locking devices to engage the PTO shaft to the implement power shaft. This requires getting down off the seat or operator station of the tractor, and it can be quite difficult and time consuming to engage the power take off.

A need exists for an apparatus and method for latching a quick attach coupler from the operator seat of the tractor. A need also exists for engaging a power take off on a tractor to a rear mounted implement, while seated on the tractor. There is a need for an apparatus and method that may be used for a variety of different implements having power shafts at different locations relative to the tractor PTO. There is a need for an apparatus and method that will allow a tractor to be hooked up to non-PTO powered Category 1 implements without removing the quick attach coupler or hitch from the tractor. There is a need for an apparatus and method that will allow hooking up a tractor to PTO driven rear mounted implements without requiring the operator to leave the tractor seat. There is a need for an apparatus and method to hook up, from the seat of the tractor, both PTO powered and non-PTO powered implements. There is a need for greater operator safety and ease of use when hooking up a tractor to a rear mounted implement.

SUMMARY OF THE INVENTION

A quick attaching coupler may be mounted to a tractor three point hitch, the quick attaching coupler having a frame, a hook on each side of the frame, each hook having a latch that pivots between a first unlatched position and a second latched position. A first handle linked to both latches may be moved between a first forward position wherein both latches are unlatched and a second rearward position wherein both latches are latched.

A quick PTO coupler also may be mounted to the quick attaching coupler, the quick PTO coupler having a sleeve carrying a first end of a tractor PTO shaft. The sleeve pivots independently of the latches between a first PTO disengaged position and a second PTO engaged position. A second handle linked to the sleeve may be moved between a first forward position wherein the PTO is disengaged and a second rearward position wherein the PTO is engaged.

The quick attach coupler and quick PTO coupler may both be operated from the seat of the tractor. As a result, latching the quick attach coupler and engaging the PTO to a rear mounted implement is safer and easier.

DESCRIPTION OF THE PREFERRED EMBODIMENT

Figure 1:
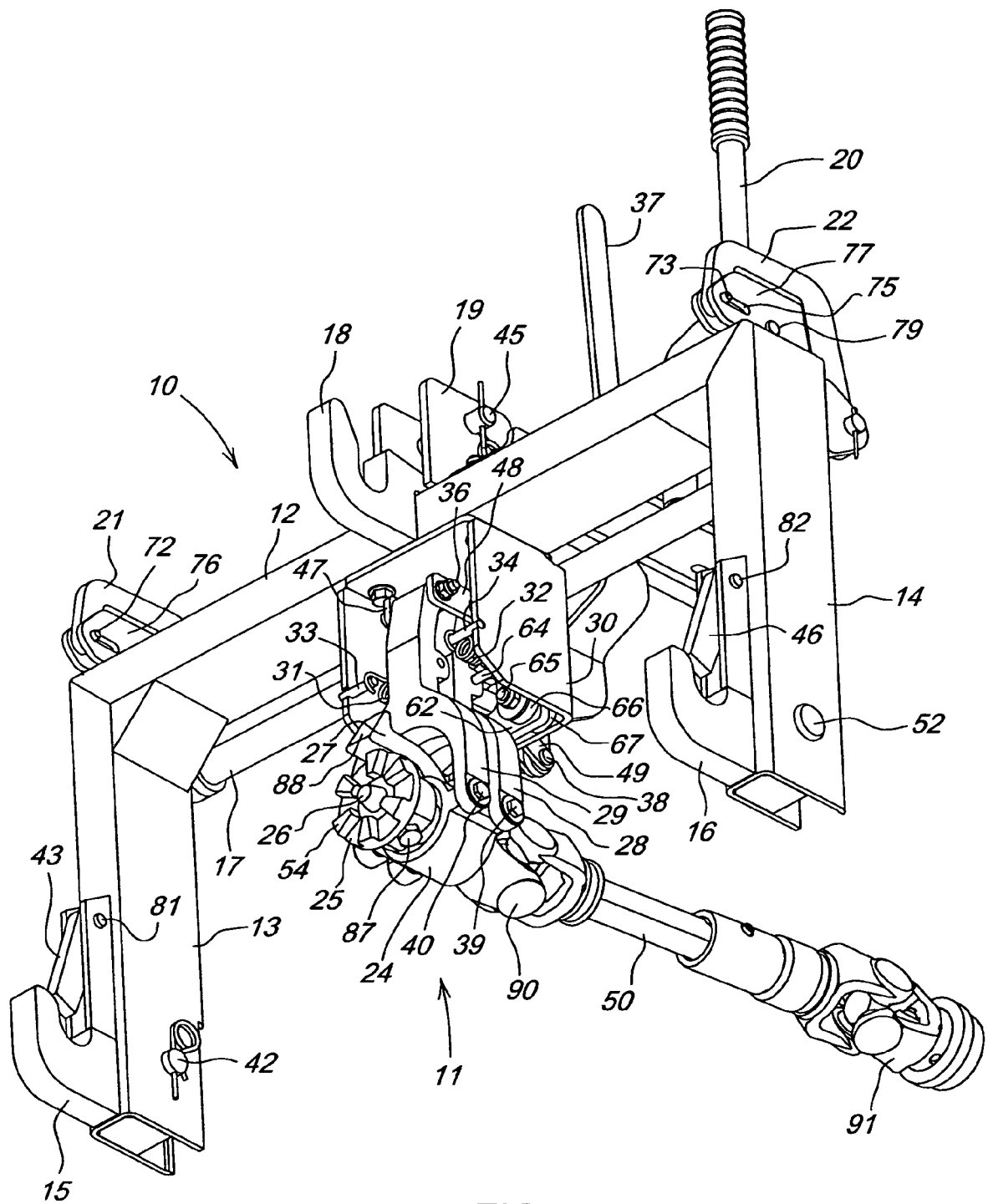
FIG. 1 is a rear perspective view of a quick attaching coupler and quick PTO coupler according to one embodiment of the invention.
Figure 2:
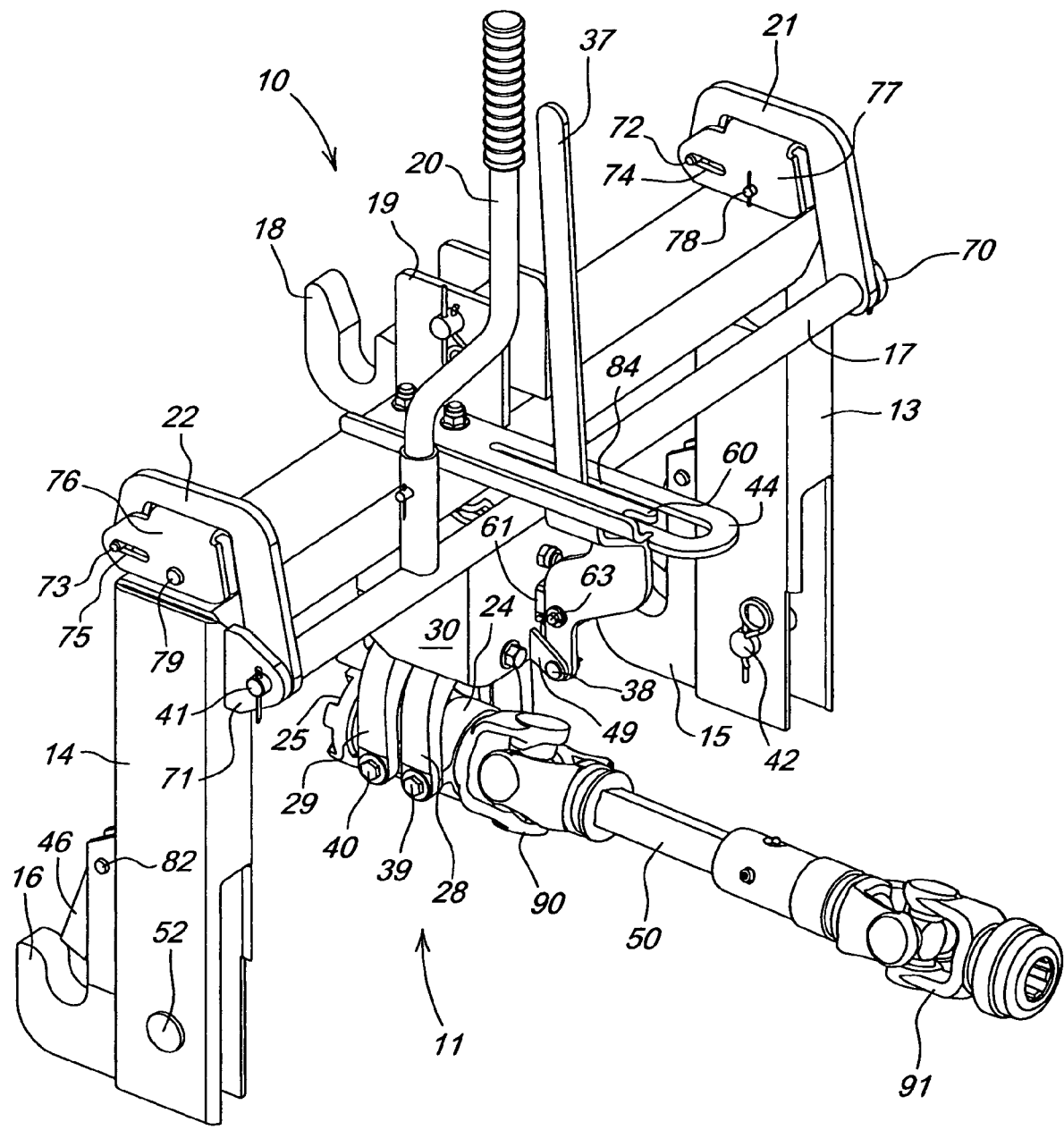
FIG. 2 is a front perspective view of a quick attaching coupler and quick PTO coupler according to one embodiment of the invention.
Figure 3:
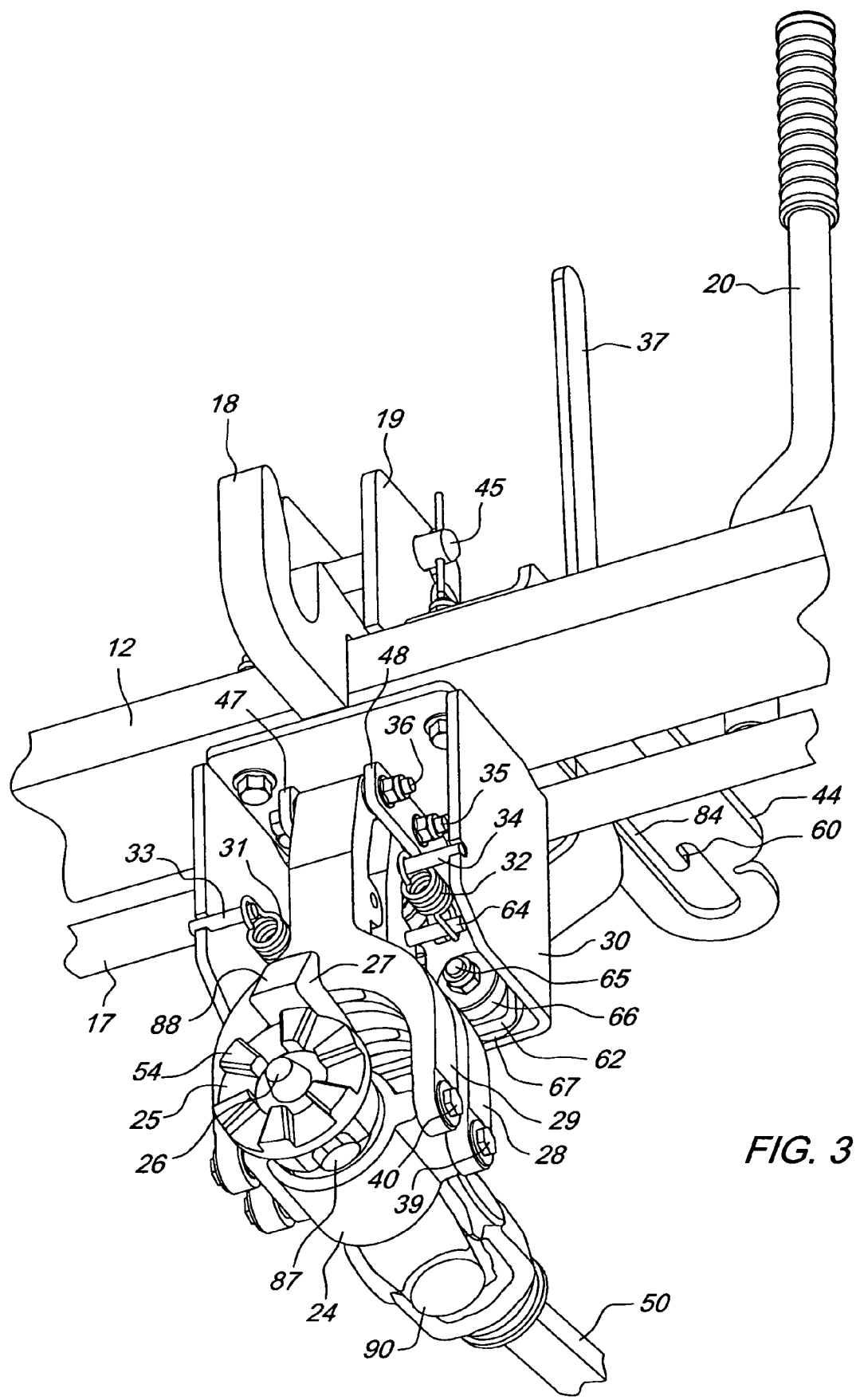
FIG. 3 is a rear perspective view of a quick PTO coupler according to the embodiment of FIGS. 1 and 2.

As shown in FIG. 1, quick attaching coupler 10 may be connected to a three point hitch on a tractor or similar vehicle. Additionally, in one embodiment, quick PTO coupler 11 also may be attached to the quick attaching coupler. As described below in more detail, the quick attaching coupler may be latched to a rear mounted implement, and/or the quick PTO coupler may be engaged to a power shaft of a rear mounted implement.

In one embodiment, quick attaching coupler 10 may be an inverted U-shaped arch having left hand leg 13 and right hand leg 14 extending downward from cross member 12. Each of the left and right legs may be provided with lower hooks 15 and 16 which are rearward projecting and upward opening. Each of lower hooks 15, 16 may have a pivoting latch 43, 46 to latch or lock in place hitch pins of a rear mounted implement. Upward opening central hook 18 may be positioned on cross member 12 at or near a midpoint between legs 13 and 14. Quick attaching coupler 10 may be secured to the hooks of a three point hitch by pin 45 through clevis 19 on cross member 12, and pins 42, 52 extending outward from legs 13 and 14.

Figure 5:
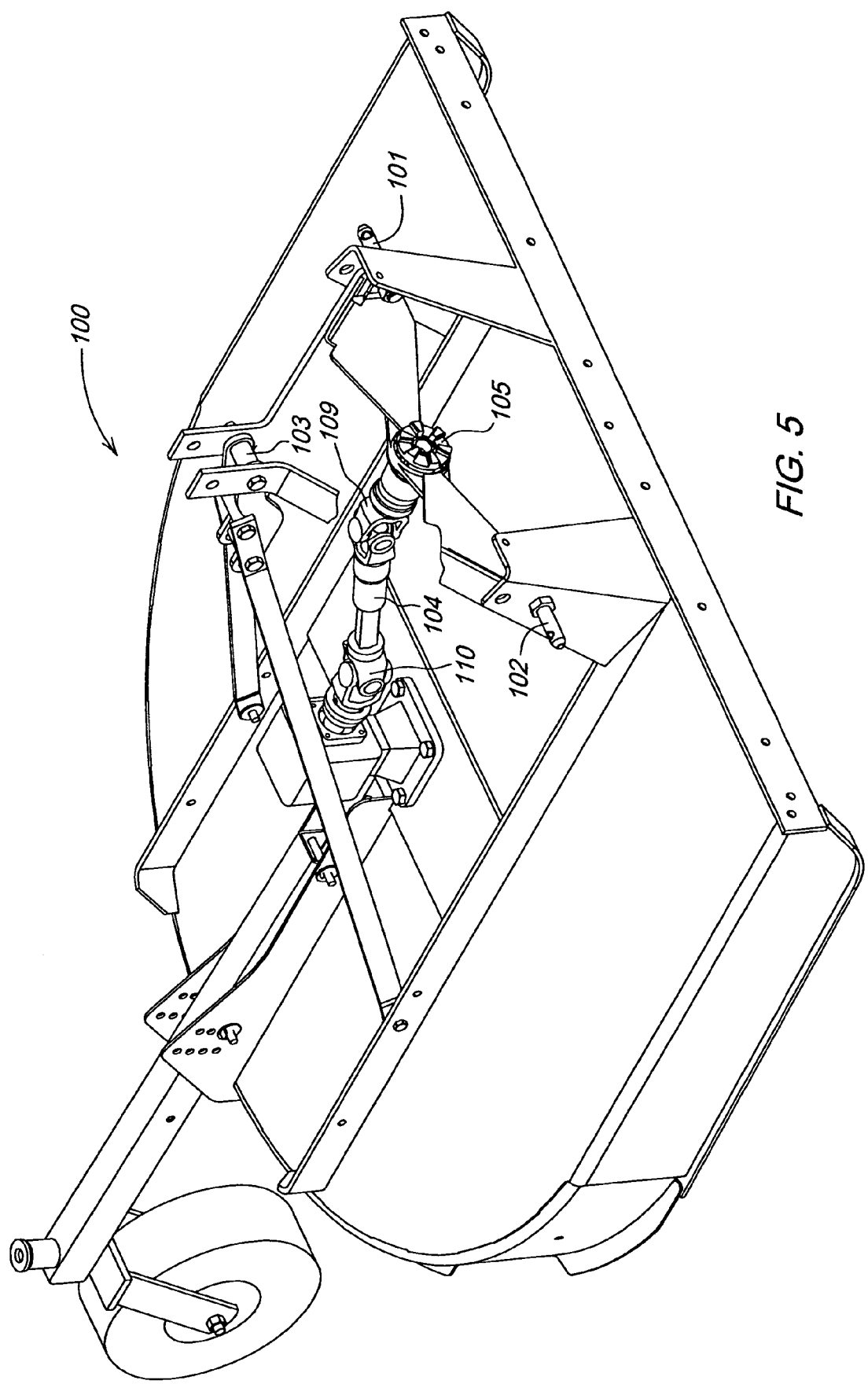
FIG. 5 is a front perspective view of an implement for attachment with the quick attaching coupler and quick PTO coupler according to the embodiment of FIGS. 1 and 2.

FIG. 5 shows a typical rear mounted mowing implement 100 that may be hooked up to quick attaching coupler 10 and/or quick PTO coupler 11. Quick attaching coupler 10 may be hooked up to a rear mounted implement by lowering the hitch and backing up the tractor and/or moving the implement into a position where lower hooks 15, 16 are under the left and right hitch pins 101, 102 of the implement, and upper hook 18 is under the upper hitch pin 103 of the implement. After the tractor and implement are properly positioned, the tractor operator may raise the quick attaching coupler sufficiently for the hitch pins to enter hooks 15, 16, 18. The operator may raise the quick attaching coupler by use of a hydraulic system for the tractor's three point hitch, preferably with controls that are accessible from the tractor operator station.

In one embodiment, a method and apparatus are provided for a tractor operator to latch or lock quick attaching coupler 10 to a rear mounted implement after the hitch pins enter hooks 15, 16, 18. Additionally, in one embodiment, a method and apparatus are provided for a tractor operator to engage tractor PTO 50 to implement PTO 104 after the quick attaching coupler is latched or locked to a rear mounted implement. The present invention provides a mechanism for the tractor operator to do either or both of these tasks without getting down off the tractor.

Figure 4:
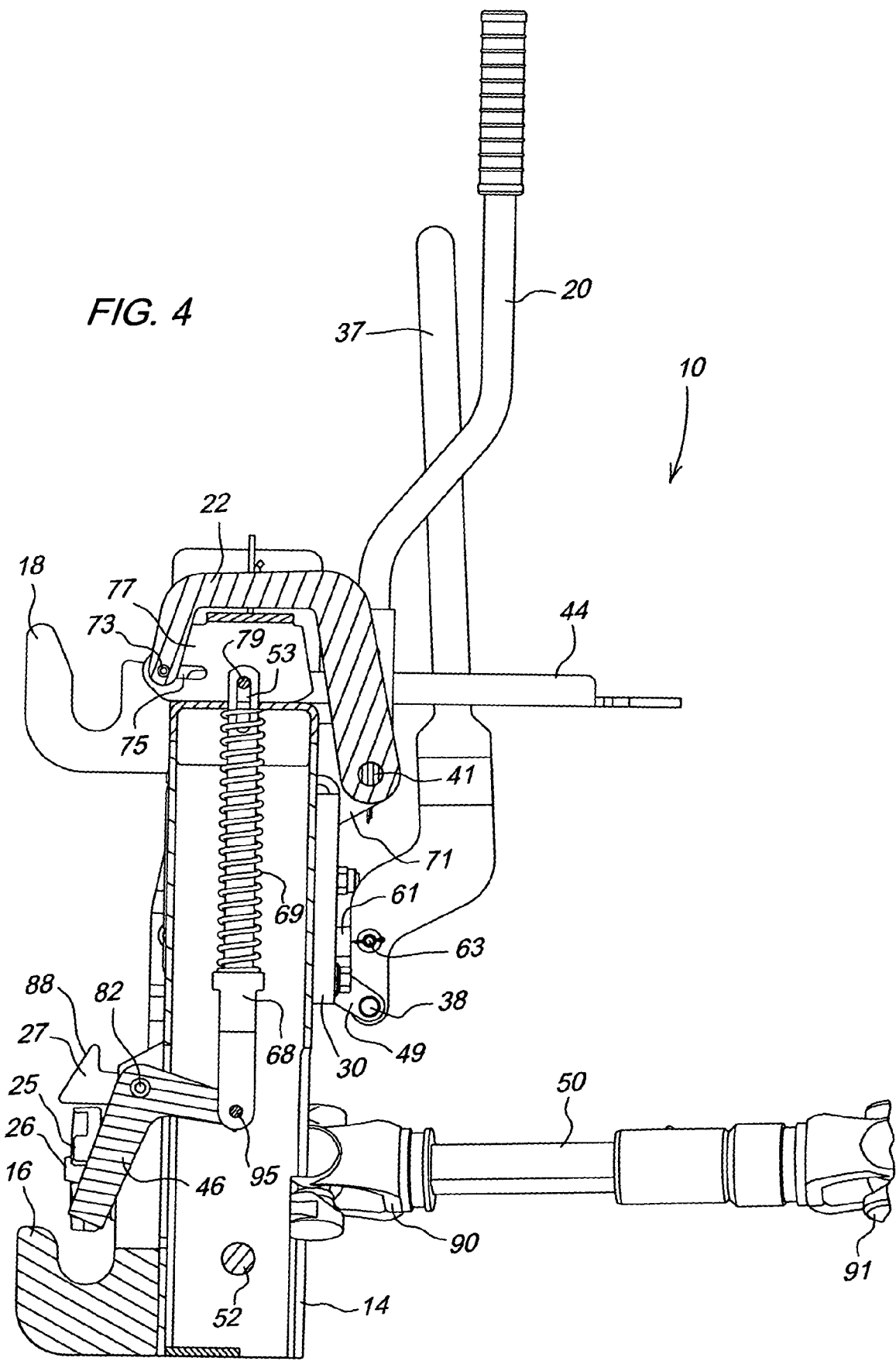
FIG. 4 is a side view, in section, of a quick attaching coupler according to the embodiment of FIGS. 1 and 2.

In one embodiment, as shown in detail FIG. 4, quick attaching coupler 10 may be latched or locked to an implement using a first actuator such as first handle 20 connected to cross bar 17. Alternative actuators such as hydraulic or electric actuators may be used instead of or in addition to first handle 20 to rotate cross bar 17 and lock or latch the quick attaching coupler to implement hitch pins. First handle 20 may be manually operated and located on the tractor or other vehicle so that it is accessible to a seated operator, preferably less about 4 feet from the operator seat. First handle 20 may have a generally vertical alignment or be generally vertically oriented. A tractor operator may pull the first handle 20 in a forward direction to a first position toward the front of the tractor to unlock latches 43, 46 from the implement, or in a rearward direction to a second position toward the rear of the tractor to latch or lock the latches to the implement. The operator may move or pivot the first handle between the first position and second position such that the upper portion of the first handle travels a distance of between about 6 inches and about 24 inches to lock or unlock the latches. By moving the first handle in a forward or rearward direction, a tractor operator may rotate cross bar 17 on its longitudinal axis between about 10 degrees and about 60 degrees.

In one embodiment, each of the two ends of cross bar 17 may be linked to latches 43, 46 that latch and unlatch the hitch pins of a rear mounted implement. Cross bar 17 may be a hollow tube having first and second ends, with pin(s) 41 inserted into the first and second ends and through projections 70, 71 on left and right legs 13, 14. The pins and projections support the cross bar and allow the cross bar to turn or rotate between about 10 degrees and about 60 degrees on its longitudinal axis to lock or unlock the latches. The first and second ends of cross bar 17 may be affixed by welds or other means to the first or lower ends of arms 21, 22 which may have a generally inverted L-shape. The second or upper ends of arms 21, 22 may be connected to links 76, 77 by pins 72, 73 that ride in slots 74, 75. In one embodiment, when the operator pushes first handle 20 to the second position toward the rear of the tractor, cross bar 17 and arms 21, 22 turn or rotate and urge links 76, 77 to move and/or pivot in a generally downward direction.

At least partially enclosed by right leg 14 of the quick attaching coupler, link 77 may be connected to the first or upper end of vertically aligned or vertically oriented bar 68 by pin 79 through slot 53. Bar 68 may extend through and be at least partially covered by right leg 14. The second or lower end of bar 68 may be pivotally connected to the first end of latch 46 by pin 95. In one embodiment, latch 46 may be an inverted L-shaped member that pivots on pin 82. Coil spring 69 may be positioned around bars 68 to urge latch 46 toward the second, or locked, position.

The same or very similar structure may be at least partially enclosed by the left leg of the quick attaching coupler. Specifically, link 76 may be connected to the first or upper end of a vertically aligned bar (not shown) by pin 78 through a slot (not shown). The second or lower end of the bar may be pivotally connected to the first end of latch 43 by a pin. Latch 43 also may be an inverted L-shaped member that pivots on pin 81. A coil spring (not shown) may be positioned around the bar in the left leg to urge latch 43 to the second, or locked position.

When the operator operates the first actuator, the bars in the left and right legs move downward and latches 43, 46 pivot toward the latched or locked position. In one embodiment, when the operator pulls first handle 20 toward the front of the tractor, both of the bars move upward and latches 43, 46 pivot toward the unlatched or unlocked position. The quick attaching coupler may be latched or unlatched from an implement by moving the first actuator such as first handle 20 rearward or forward, as the case may be, while the operator remains in the operator station of the tractor or other similar vehicle.

In one embodiment, quick PTO coupler 11 also may be engaged to a rear mounted implement. The quick PTO coupler may be operated by a second actuator that is easily accessible to an operator positioned in the operator station of the tractor. For example, the second actuator may be second handle 37 which preferably is less than about 4 feet from the tractor seat. Second handle 37 may be used to engage or disengage the first end of PTO 50 with an implement power shaft 104. Alternatively, or in addition to the second handle, the second actuator for the quick PTO coupler may operate hydraulically or electronically.

Preferably, the second actuator for the quick PTO coupler may be positioned adjacent the first actuator for the quick attaching coupler. However, the first actuator and the second actuator work independently of each other. Thus, the quick attaching coupler may hook up and latch a rear mounted implement before or without engagement of the quick PTO coupler to the implement power shaft.

In one embodiment, second handle 37 may have a generally vertical alignment or be vertically oriented and may pivot on an axis at or near the first or lower end thereof. The axis may be pin 38 inserted through the first or lower end of second handle 37, and through arm(s) 49 secured by welding or other attachment means to housing 30 or another rigid component of the quick PTO coupler.

In one embodiment, second handle 37 extends through slotted plate 44 which may be mounted to cross member 12. Slot 84 serves to limit travel of the second handle. Slot 84 may have a stop or catch 60 at or adjacent the first or forward end thereof to hold and maintain second handle 37 in a first position in which the PTO shaft is disengaged from the implement power shaft. Slot 84 also may be dimensioned to have sufficient length for some variability in the travel of second handle 37 when it pivots toward the second end of the slot to a second position in which the PTO is engaged to an implement power shaft. The variability may allow the quick PTO coupler to engage implement power shafts having various different locations relative to the tractor PTO, so that the second or PTO engaged position may vary from implement to implement. In one embodiment, second handle 37 may pivot between about 10 degrees and about 60 degrees to move the quick PTO coupler between the first or disengaged position and the second or engaged position. Slot 84 may have a length of between about 6 inches and 24 inches, depending on the mounting position of slotted plate 44 relative to handle 37.

In one embodiment, the quick PTO coupler includes a pair of yokes 28, 29 that carry sleeve 24 through which the first end of PTO shaft 50 extends. The yokes may be used to suspend sleeve 24 under cross member 12. When an operator pulls second handle 37 toward the front of the tractor, the yokes move sleeve 24 forward so that the first end of PTO shaft 50 moves out of engagement with implement power shaft 104. When the operator pushes second handle 37 rearward, the yokes move sleeve 24 rearward so that the first end of PTO shaft 50 moves into engagement with implement power shaft 104.

In one embodiment, quick PTO coupler 11 may include housing 30 bolted or otherwise secured to cross member 12. The housing may be a generally box-like structure having one or more open surfaces or side panels. Housing 30 may provide one or more plates, braces and/or mountings for components of the quick PTO coupler. For example, plate 62 may be secured to housing 30 by threaded fasteners 65 and rubber isolators 66, 67. Additionally, plates 47, 48 may be secured to plate 62 by welds or other securing means. Posts 33, 34 also may be secured to housing 30 by welds or other securing means.

In one embodiment, the upper portions of yokes 28, 29 are hinged to the cross member of the quick attaching coupler or another fixed component on the rear of the tractor. For example, yokes 28, 29 may be hinged to plates 47, 48 by cross bolts 35, 36. As noted above, plates 47, 48 are welded to plate 62, which is then attached to housing 30 using bolts with rubber isolators. The lower portions of yokes 28, 29 are hinged to sleeve 24 by threaded fasteners 39, 40. Yokes 28, 29 are both hinged to sleeve 24, so that both yokes swing together rearward to move PTO shaft 50 into engagement with an implement power shaft, or forward to move PTO shaft 50 out of engagement with an implement power shaft. Preferably, PTO shaft 50 extending through sleeve 24 should maintain a generally horizontal alignment in the engaged or disengaged positions.

In one embodiment, when sleeve 24 moves or swings PTO shaft 50 into engagement with an implement power shaft, the sleeve carrying the PTO shaft may move or swing between about 3 inches and about 24 inches forward or rearward horizontally. The span between the forward and rearward positions may depend on the location of the implement power shaft. As the sleeve swings the PTO shaft into or out of engagement with the implement power shaft, the sleeve may move slightly vertically, generally less than about 3 inches.

In one embodiment, link 61 connects second handle 37 to yoke 28 by pins 63, 64. Link 61 may extend through an opening in housing 30. By moving or pivoting second handle 37 rearward, link 61 is pushed rearward, causing yokes 28 and 29 to swing rearward and move the PTO shaft into engagement with an implement power shaft. One or more coil springs 31, 32, or other biasing means, may extend between pin 64 and posts 33, 34. The coil springs may urge the quick PTO coupler toward the second or engaged position.

In one embodiment, coupler 25 may be connected to the end of PTO shaft 50 by cross bolt or pin 87. Coupler 25 may be a generally circular plate having a diameter between about 3 inches and about 6 inches. A plurality of teeth 54 may project rearward from the plate surface to interengage corresponding teeth on an implement power shaft coupler. In one embodiment, each of six teeth may project rearward from the coupler surface between about ½ inch and about 2 inches. Each tooth may be generally wedge shaped and extend radially outward from a first radius to a second or outer radius of the coupler.

Additionally, coupler 25 may have a centering hub 26 to help guide engagement of the coupler with a corresponding coupler on the power shaft of the rear mounted implement. In one embodiment, centering hub 26 may be a generally conical or frustaconical projection that extends about ½ inch to about 2 inches from the face of the coupler.

Figure 6:
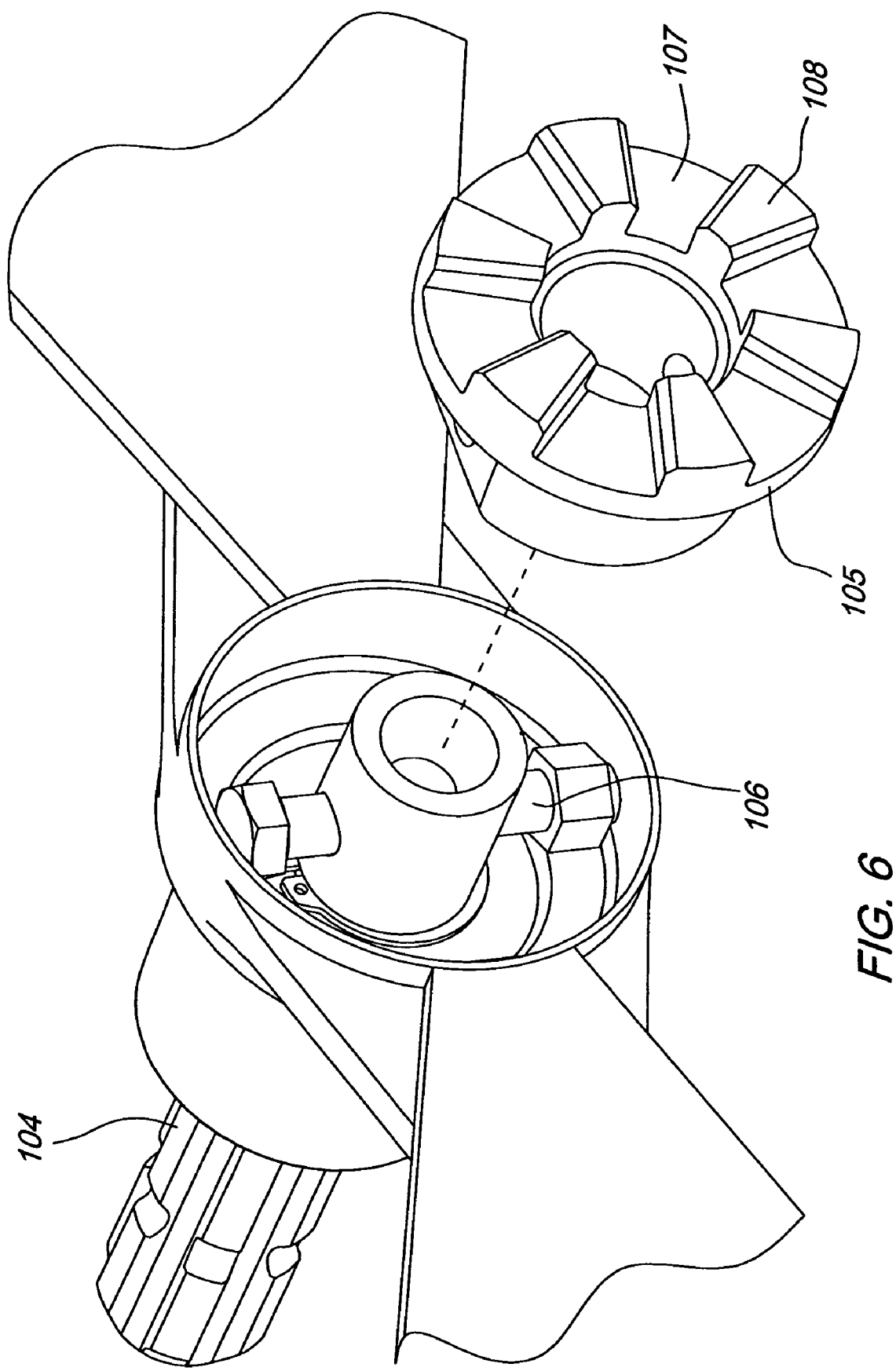
FIG. 6 is a rear perspective view, partially exploded, of a coupler of an implement adapted for attachment to the quick PTO coupler according to the embodiment of FIGS. 1 and 2.

As shown in FIGS. 5 and 6, implement power shaft 104 may have a coupler 105 attached to the end thereof. Coupler 105 may have generally the same or similar construction as coupler 25. For example, coupler 105 may be connected to the end of implement power shaft 104 by cross bolt or pin 106. Coupler 105 may be a generally circular plate with a plurality of teeth 108 projecting rearward from the plate surface, each tooth extending radially outward from a first radius to a second or outer radius of the coupler. Coupler 105 may have a centering recess 107 to help guide engagement of with coupler 25. In one embodiment, centering recess 107 may be have a generally conical or frustaconical shape for receiving centering hub 26 therein. For other implements, such as a tiller, coupler 105 may be directly mounted to a gear box shaft instead of a power shaft. In another embodiment, the coupler on the end of the PTO shaft may be splined externally to engage a mating internally splined coupler on the implement power shaft.

PTO shaft 50 may telescope or extend sufficiently to accommodate the forward and rearward motion of sleeve 24 of the quick PTO coupler. PTO shaft 50 also may have one or more universal joints 90, 91. The universal joints may allow for desired movement, positioning and alignment of the PTO shaft. Similarly, implement power shaft may have one or more universal joints 109, 110 which may help provide for desired movement, positioning and alignment of the implement power shaft.

In one embodiment, bumper 27 may extend rearward over sleeve 24 for deflecting implement power shaft 104 and coupler 105 before engagement. In one embodiment, bumper 27 projects rearward from sleeve 24 and extends over sleeve and extends at least partially over coupler 25. In one embodiment, bumper 27 is integral with or affixed to sleeve 24. Bumper 27 may have a downward sloping rear facing surface 88. As the quick attaching coupler is raised to hook up the implement, the sloped surface 88 of bumper 27 may contact and deflect implement power shaft 104 and coupler 105 sufficiently to prevent those components from hanging up on or impacting the upper side of coupler 25. The sloped surface 88 causes the implement power shaft to slide downward sufficiently for coupler 105 to face and align with coupler 25, reaching the desired position for engagement.

In a second embodiment, the end of PTO shaft 50 may be carried by an inverted U-shaped bracket, instead of a pair of yokes and sleeve. A bumper may be integral with or attached to the bracket. A rod and pivoting linkage may connect between the second handle or second actuator and the bracket. When the operator moves the second actuator forward or rearward, the rod and pivoting linkage causes the end of the PTO shaft to telescope forward or rearward. The rod may have a generally horizontal alignment, and helps the end of the PTO shaft to maintain a generally horizontal alignment. For example, the rod may extend through one or more bearings or openings in plates attached to the quick PTO coupler.

Having described the preferred embodiment, it will become apparent that various modifications can be made without departing from the scope of the invention as defined in the accompanying claims.

The invention claimed is:

1. An apparatus comprising:
   a quick attaching coupler mounted to a tractor three point hitch, the quick attaching coupler having a frame, a hook on each side of the frame, each hook having a latch pivotable between a first unlatched position and a second latched position;
   a first actuator linked to both latches by links at least partially enclosed by each side of the frame, the first actuator movable between a first position wherein both latches are unlatched and a second position wherein both latches are latched;
   a quick PTO coupler mounted to the quick attaching coupler, the quick PTO coupler having a sleeve carrying a first end of a tractor PTO shaft, the sleeve pivotable independently of the latches between a first PTO disengaged position and a second PTO engaged position;
   a second actuator linked to the sleeve, the second actuator movable between a first position wherein the PTO is disengaged and a second position wherein the PTO is engaged; and
   a pair of yokes carrying the sleeve, the yokes having an upper end hinged to the quick attaching coupler and a lower end hinged to the sleeve.

2. The apparatus of claim 1 further comprising at least one spring connected to the quick PTO coupler to urge it toward the second PTO engaged position.

3. The apparatus of claim 1 further comprising a toothed coupler connected to the first end of the tractor PTO shaft.

4. The apparatus of claim 1 wherein the first actuator is a handle that pivots between about 10 degrees and about 60 degrees.

5. The apparatus of claim 1 wherein the second actuator is a handle that pivots between about 10 degrees and about 60 degrees.

6. An apparatus comprising:
   a quick attaching coupler mounted to a tractor three point hitch, the quick attaching coupler having a frame, a hook on each side of the frame, each hook having a latch pivotable between a first unlatched position and a second latched position;
   a first actuator linked to both latches, the first actuator movable between a first position wherein both latches are unlatched and a second position wherein both latches are latched;
   a quick PTO coupler mounted to the quick attaching coupler, the quick PTO coupler having a sleeve carrying a first end of a tractor PTO shaft, the sleeve pivotable independently of the latches between a first PTO disengaged position and a second PTO engaged position;
   a second actuator linked to the sleeve, the second actuator movable between a first position wherein the PTO is disengaged and a second position wherein the PTO is engaged; and
   a bumper extending from the rear of the quick PTO coupler and having a sloped rearward extending surface.

7. An apparatus comprising:
   a tractor having an engine, a power take off connected to the engine, and a frame having a cross member and left and right downward extending legs, each leg having a rearward facing and upward opening hook, each hook having a latch, both latches linked to opposing ends of a cross bar having a longitudinal axis parallel to the cross member, the cross bar rotatable between about 10 degrees and about 60 degrees with respect to its longitudinal axis, the cross bar connected to a first actuator to rotate the cross bar and move the latches between a first unlatched position and a second latched position; and
   a sleeve suspended under the cross member by a yoke hinged to the sleeve and to the cross member, the power take off extending through the sleeve, the sleeve moving forward to move the power take off to a first disengaged position and rearward to move the power take off to a second engaged position, the sleeve linked to a second actuator to move the power take off between the first disengaged position and the second engaged position.

8. The apparatus of claim 7 further comprising a pair of hinged yokes suspending the sleeve under the cross member.

9. The apparatus of claim 8 further comprising a toothed circular plate attached to the power take off.

10. The apparatus of claim 8 wherein the second engaged position may vary between about 3 inches and about 24 inches from the first disengaged position.

11. An apparatus comprising:
    a tractor having an engine, a power take off connected to the engine, and a frame having a cross member and left and right downward extending legs, each leg having a rearward facing and upward opening hook, each hook having a latch, both latches linked to opposing ends of a cross bar having a longitudinal axis, the cross bar rotatable between about 10 degrees and about 60 degrees with respect to its longitudinal axis, the cross bar connected to a first actuator to rotate the cross bar and move the latches between a first unlatched position and a second latched position;
    a sleeve suspended under the cross member, the power take off extending through the sleeve, the sleeve moving forward to move the power take off to a first disengaged position and rearward to move the power take off to a second engaged position, the sleeve linked to a second actuator to move the power take off between the first disengaged position and the second engaged position; and a bumper extending over and rearward of the sleeve and having a downward and rearward sloping surface.

12. An apparatus comprising:

a tractor having an engine, a power take off connected to the engine, and a frame having a cross member and left and right downward extending legs, each leg having a rearward facing and upward opening hook, each hook having a latch, both latches linked to opposing ends of a cross bar having a longitudinal axis, the cross bar rotatable between about 10 degrees and about 60 degrees with respect to its longitudinal axis, the cross bar connected to a first actuator to rotate the cross bar and move the latches between a first unlatched position and a second latched position;

a sleeve suspended under the cross member, the power take off extending through the sleeve, the sleeve moving forward to move the power take off to a first disengaged position and rearward to move the power take off to a second engaged position, the sleeve linked to a second actuator to move the power take off between the first disengaged position and the second engaged position; and a vertically oriented bar extending through each leg between the latch and the cross bar.

13. An apparatus comprising:

a sleeve having a first end of a power take off shaft extending thereth rough;

a toothed coupling attached to the first end of the power take off shaft;

a pair of yokes having hinged upper portions and lower portions to swing the sleeve forward and rearward; and a spring urging the sleeve rearward; and an actuator linked to the yokes and movable to swing the sleeve forward out of engagement and rearward into engagement.

14. An apparatus comprising:

a sleeve having a first end of a power take off shaft extending thereth rough;

a toothed coupling attached to the first end of the power take off shaft;

a pair of yokes suspending the sleeve and hinged to swing the sleeve forward and rearward; and a spring urging the sleeve rearward;

an actuator linked to the yokes and movable to swing the sleeve forward out of engagement and rearward into engagement;

wherein the actuator is a handle, and further comprising a slotted plate through which the handle extends.

15. The apparatus of claim 14 wherein the slotted plate has a slot with a catch position to hold the handle in the forward position.

16. The apparatus of claim 14 wherein the rearward position is between 3 and 24 inches from the forward position.

17. An apparatus comprising:

a quick attaching coupler mounted to a tractor three point hitch, the quick attaching coupler having a frame, a hook on each side of the frame, each hook having a latch pivotable between a first unlatched position and a second latched position;

a first actuator linked to both latches at least partially through each side of the frame, the first actuator movable between a first position wherein both latches are unlatched and a second position wherein both latches are latched;

a quick PTO coupler mounted to the quick attaching coupler, the quick PTO coupler having a sleeve carrying a first end of a tractor PTO shaft;

a yoke hinged to the frame and to the sleeve such that the sleeve can swing fore and aft between a first PTO disengaged position and a second PTO engaged position; and a second actuator linked to the sleeve, the second actuator movable between a first position wherein the PTO is disengaged and a second position wherein the PTO is engaged.

18. The apparatus of claim 17 further comprising a pair of yokes carrying the sleeve, the yokes having an upper end hinged to the quick attaching coupler and a lower end hinged to the sleeve.

19. The apparatus of claim 17 further comprising springs biasing the latches toward the second latched position.

* * * * *